United States Patent [19]

Fiala

[11] Patent Number: 5,159,870
[45] Date of Patent: Nov. 3, 1992

[54] PORTABLE ELECTRIC CUTTING AND SCORING SAW

[76] Inventor: Paul E. Fiala, 7205 Shadyoak Dr., Downey, Calif. 90240

[21] Appl. No.: 745,412

[22] Filed: Aug. 15, 1991

[51] Int. Cl.$^5$ .............................................. B27B 9/00
[52] U.S. Cl. ....................................... 83/863; 30/374; 30/388; 83/13; 144/3 R
[58] Field of Search ................... 83/863, 864, 13, 14, 83/39; 30/374, 388; 144/1 R, 3 R, 368

[56] References Cited

U.S. PATENT DOCUMENTS

| | | | |
|---|---|---|---|
| 1,753,959 | 4/1930 | Wikstrom. | |
| 3,120,777 | 2/1964 | Genin | 83/863 |
| 3,924,328 | 12/1975 | Mould | 30/307 |
| 4,058,150 | 11/1977 | Pennington | 30/388 |
| 4,087,914 | 5/1978 | Bates | 30/374 |
| 4,245,390 | 1/1981 | Bond | 30/374 |
| 4,706,535 | 11/1987 | Ducharme | 83/863 |
| 4,711,147 | 12/1987 | Dettelbach et al. | 83/863 |

FOREIGN PATENT DOCUMENTS

| | | | |
|---|---|---|---|
| 0324444 | 7/1989 | European Pat. Off. | 83/863 |
| 281842 | 1/1979 | Fed. Rep. of Germany | 83/863 |

OTHER PUBLICATIONS

Sales Brochure—Holz Machining Corp., Jersey City, N.J. U.S.A. Publication Date Not Known.
Sales Brochure—Dankey International, Taipei, Taiwan, Publication Date Not Known.
Sales Brochure—Griggio, Padova, Italy, Publication Date Not Known.
Sales Brochure—Gruppo Sicar, Capri, Italy, Publication Date Not Known.
Sales Brochure—Altendorf America, Grand Rapids, Michigan U.S.A., Publication Date Not Known.

*Primary Examiner*—Hien H. Phan
*Attorney, Agent, or Firm*—Howard A. Kenyon

[57] ABSTRACT

A portable electric cutting and scoring saw for use on laminated or veneer products is disclosed. The scoring saw is disposed in front of the cutting saw and turns in the opposite direction. The saw is designed primarily for an on-the-job cabinet maker where the use of large industrial bench saws are not feasible. The scoring saw cuts at a fixed depth and the cutting saw depth of cut can be varied by changing the blade with a different diameter. The laminate or veneer to be cut is bonded to the workpiece and the scoring saw eliminates chipping of the laminate or veneer. The scoring saw and the cutting saw lie in the same plane.

18 Claims, 2 Drawing Sheets

PORTABLE ELECTRIC CUTTING AND SCORING SAW

BACKGROUND OF THE INVENTION

1. Field of the Invention

The present invention relates in general to a portable electric cutting and scoring saw to be used on-the-job by an experienced cabinet maker where laminates or veneers that are to be cut lie on the top surface or on the top and bottom surfaces of a workpiece.

2. Description of the Prior Art

There are many cutting and scoring saws of the large industrial bench type available on the market. These bench type cutting and scoring saws are designed for a factory that manufactures furniture or kitchen cabinets. Some of these manufacturers are Alendorf, Grand Rapids, Mich., Frama-Tech Inc., Paramount, Calif., Magic s.p.a., Modena, Italy, Kunang Yung Machinery Co. Ltd. Taiwan R.O.C., Holz, Jersey City, N.J. and Griggio, Palova, Italy.

All of these above companies manufacture equipment that have a separate motor for the cutting and scoring saw; some of the cutting saws use motors as large as 10 H.P. U.S. Pat. No. 4,706,535 describes and claims a scoring saw assembly for use with a conventional bench saw having a table with a longitudinal opening.

In addition, there are portable saws with devices attached thereto that provide a sharp scoring wheel mounted ahead of the cutting saw that cuts into the outer surface. U.S. Pat. No. 4,245,390 describes a scoring attachment on a spring arm that forces the wheel into the surface as the portable saw is pushed across the workpiece. U.S. Pat. No. 4,711,147 describes an attachment containing two scoring wheels mounted ahead of the cutting saw where the two wheels score a width equal to the saw cut. Again the saw must be pushed by the operator and the scoring wheels are spring biased. Neither of the above patents have a portable powered scoring saw as in the present invention. What is needed is a portable electrical powered cutting saw in combination with a powered scoring saw that can be used on-the-job by a skilled cabinet maker when cutting laminates or veneer. Accordingly, a fuller understanding of the invention may be obtained by referring to the summary of the invention, and the detailed description of the preferred embodiment, in addition to the scope of the invention defined by the claims taken in conjunction with the accompanying drawings.

SUMMARY OF THE INVENTION

It is the object of the present invention to provide a portable electric cutting and scoring saw.

It is another object of the present invention to provide a portable electric cutting and scoring saw where the cutting blade and scoring blade turn in opposite directions.

It is yet another object of the present invention when the cutting saw and scoring saw lie in the same plane.

It is still another object of the present invention where the scoring saw cut is wider than the cutting saw cut.

Briefly, in accordance with the present invention, there is provided a portable cutting and scoring saw that is used primarily by a cabinet maker that must custom make laminate or veneer workpieces on-the-job. The saws are attached to shafts that are fitted with ball bearings and placed inside a casing. The saw shafts contain helical gears that mesh with helical gears attached to electrical power means. The saws in the present invention are fixed where the scoring saw cuts a depth of $\frac{1}{8}$ inch and the cutting saw can cut a depth of $\frac{3}{4}$ to $1\frac{3}{4}$ inches depending on the diameter of the cutting saw blade. It is estimated that these cutting depths will cover almost all of the requirements that a on-the-job cabinet maker will have. The cutting saw plane lies inside the scoring saw plane and the scoring saw blade has approximately a 0.002 inch width on each side of the cutting saw blade.

The novel features which are believed to be characteristic of the invention as to the system together with further objects and advantages thereof, will be better understood from the following description in connection with the accompanying drawings in which the presently preferred embodiments of the invention is illustrated by way of example. It is to be expressly understood, however, that the drawings are for purposes of illustration and description only, and are not intended as a definition of the limits of the invention.

These and other objectives, features and advantages of the present invention will become more readily apparent upon detailed consideration of the following description of a preferred embodiment with reference to the accompanying drawings.

DESCRIPTION OF THE PREFERRED EMBODIMENT

Figure 1:
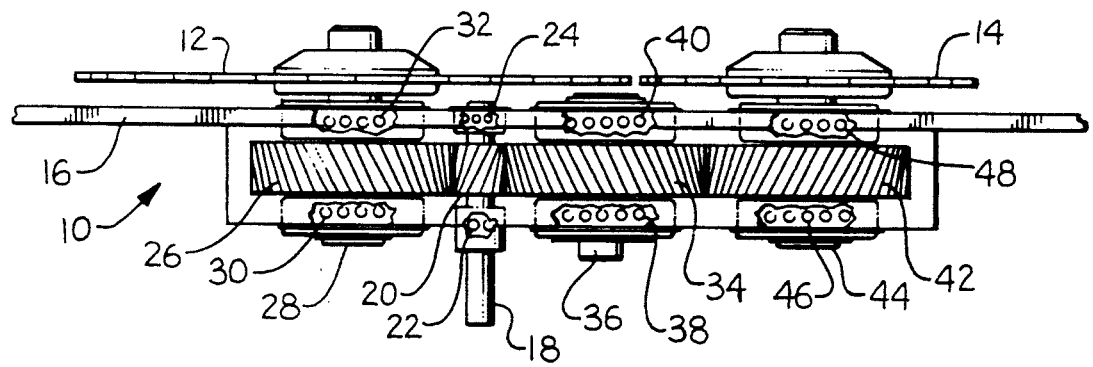
FIG. 1 is a cut away view that shows the drive shaft, helical gears, ball bearings with the cutting and scoring saws lying in the same plane.

Turning now to FIG. 1 there is shown a cutaway drawing 10 of the cutting saw 12, scoring saw 14 and a member of the gearbox housing 16. Also shown is drive shaft 18 that is attached to a motor (not shown) in the motor housing 64 in FIG. 4. Drive shaft 18 contains drive gear 20 and drive shaft bearings 22 and 24. Drive gear 20 is in meshing relationship with cutting saw gear 26 which is fitted on cutting saw shaft 28. Cutting saw shaft 28 contains bearings 30 and 32. Drive gear 20 is also in meshing relationship with idler gear 34 which is fitted on idler gear shaft 36. Idler gear shaft 36 contains bearings 38 and 40. Idler gear 34 is in meshing relationship with scoring saw gear 42 which is fitted on scoring saw shaft 44. Scoring saw shaft 44 contains bearings 46 and 48. Drive shaft 18 is driven such that the minimum speed is 20,000 R.P.M. The drive shaft gear 18 provides a 4 to 1 relationship with the cutting saw gear 26 and idler gear 34. Since the scoring saw gear 42 and the idler gear 34 are the same diameter, the minimum speed of the cutting saw 12 and scoring saw 14 is 5,000 R.P.M. It is noted that the gears 20, 26, 34 and 42 are all helical gears. It was determined that this type of gear is best suited for high speed which is required for the scoring saw 12. The bearings 30, 32, 22, 23, 38, 40, 46 and 48 are all self-lubricating types.

Figure 2:
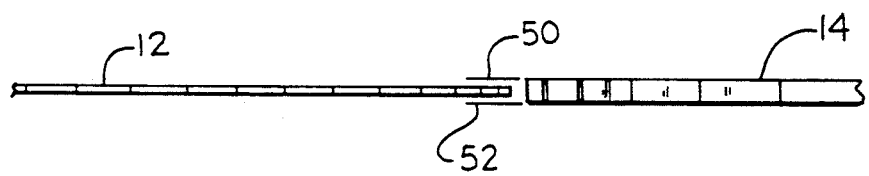
FIG. 2 shows the scoring saw and cutting saw relative thickness.

Turning now to FIG. 2 there is seen an exaggerated edge profile of the cutting saw 12 and scoring saw 14. The thickness of the scoring saw 14 is 0.004 inches greater than that of the cutting saw 12. Since the center plane of the cutting saw 12 and the center plane of the scoring saw 14 lie in the same plane, the scoring saw 12 thickness is approximately 0.002 inches greater on each side than the thickness of the cutting saw 14. This is shown by 50 and 52 in FIG. 2 which is an edge view of the portable electric cutting and scoring saw.

Figure 3:
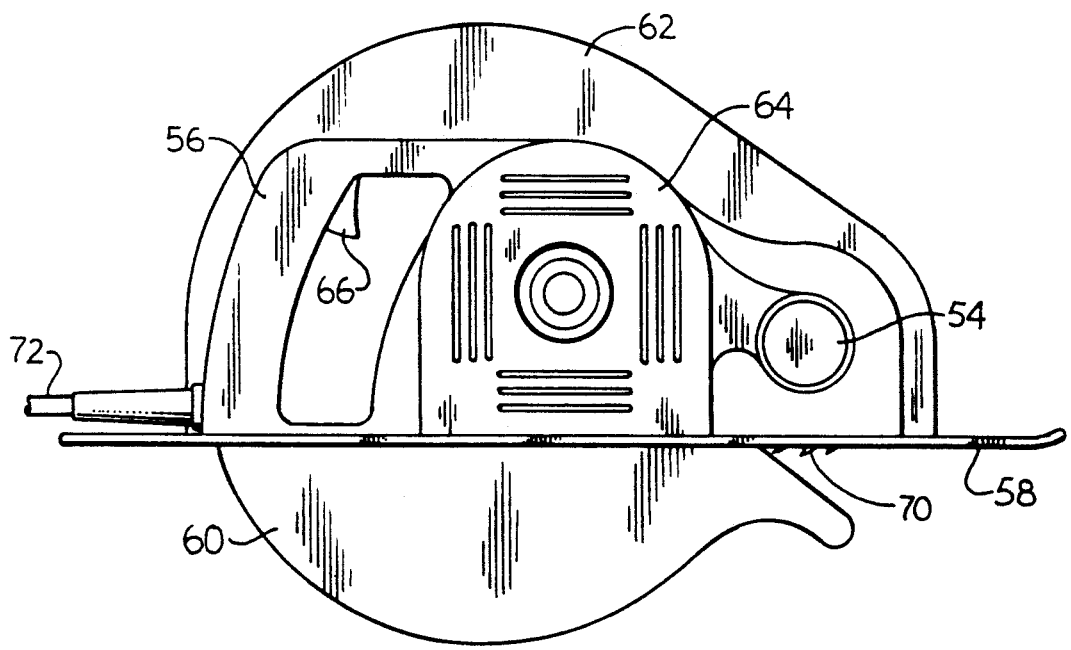
FIG. 3 is a side view showing the motor, housing, saw handles and the bottom part of the blade guard.

Turning now to FIG. 3, there is shown a front handle 54, a blade guard 60, a saw housing 62, and a motor housing 64. Trigger switch 66 which is spring biased is shown fitted in handle 56. Scoring teeth 70 can be seen protruding below the base plate 58. The cutting saw in this view is hidden by the blade guard 60. The power cord 72 can be seen at the bottom of handle 56. Although it is not shown, the electric motor could be powered by a rechargable battery.

Figure 4:
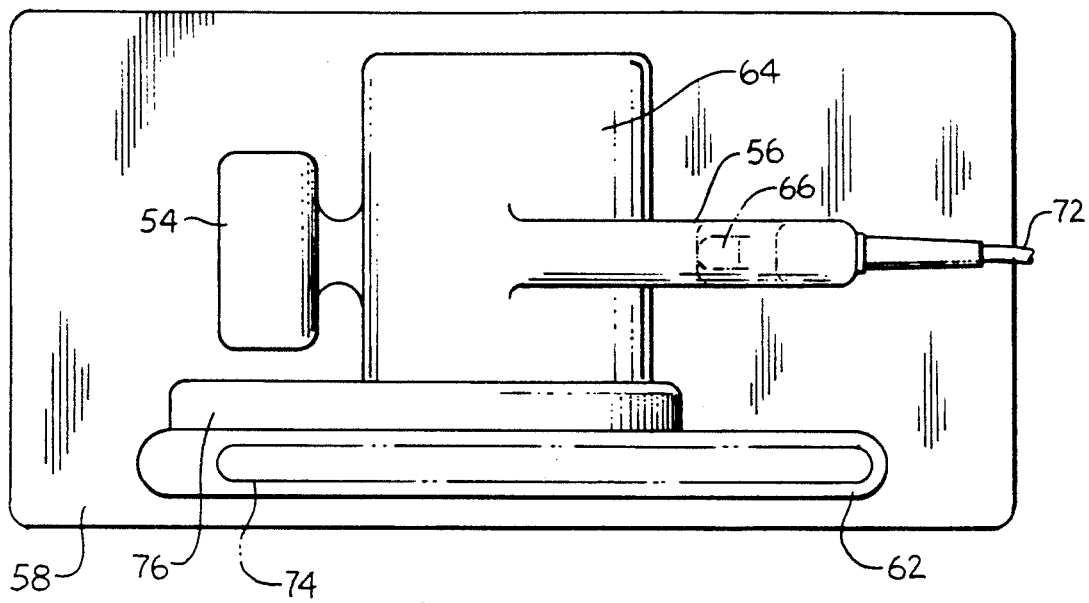
FIG. 4 is a top view of the scoring and cutting saw assembly.

FIG. 4 shows a top view of the portable electric cutting and scoring saw. Base plate 58 contains a groove 74 where the scoring saw 14, cutting saw 12 protrudes and blade guard 60 rotates. Also seen in this view is the saw housing 62, the gear housing 76, motor housing 64, front handle 54 and rear handle 56. Trigger switch 66 is shown in phantom and power cord 72 is also shown.

Figure 5:
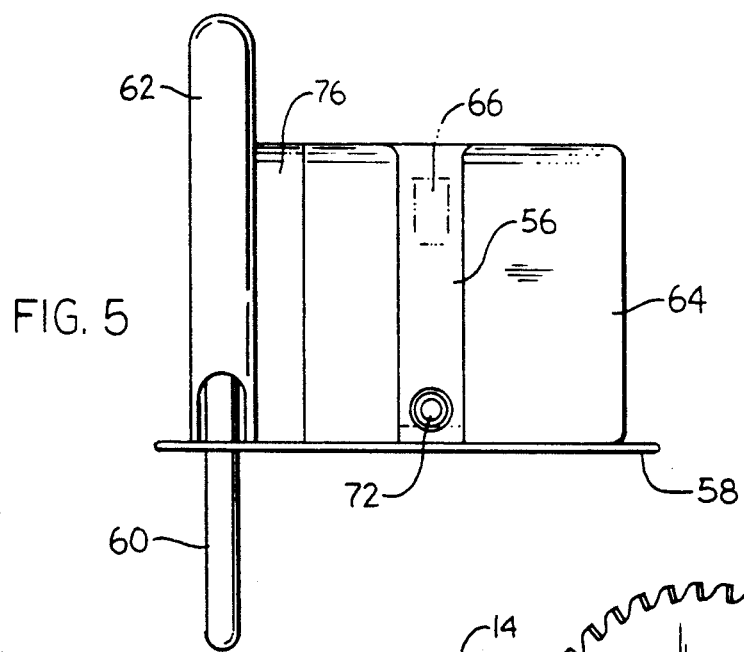
FIG. 5 show a rear view of the scoring and cutting saw assembly.

FIG. 5 shows the rear view of the portable electric cutting and scoring saw. Base plate 58, motor housing 64, saw housing 62, gear housing 76 and blade guard 60 are also shown in this view. Rear handle 56, trigger switch 66 shown in phantom and power cord 72 are also shown.

Figure 6:
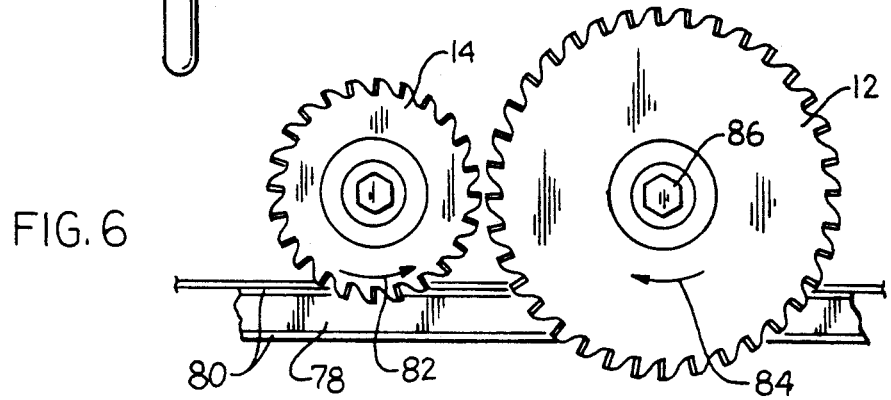
FIG. 6 shows the two blades in relation to each other.

FIG. 6 shows an isolated view of the scoring saw 14 and cutting saw 12. The saws rotate in opposite direction as indicated by the arrows 82 and 84 on the face of the scoring saw 14 and cutting saw 12. A workpiece 78 with a laminate or veneer 80 bonded thereto is shown being cut by the portable electric cutting saw 12 and scoring saw 14. The laminate or veneer 80 is shown bonded to both sides of the workpiece 78. However, on most of the on-the-job tasks, the laminate or veneer 80 will be bonded to the top side of workpiece 78. The diameter of the scoring saw 14 is fixed at 3⅜ inches which allows a cutting depth of ⅛ inch. The cutting saw 12 depth of cut varies from ¾ inch to 1¾ inches. Blade diameters available are 4½, 5, 5½, 6 and 6½ inches. The 4½ inch diameter blade provides a ¾ inch depth of cut and the 6½ inch blade provides a 1¾ inch depth of cut. Since neither blade is adjustable, the only way the blade depth can be varied is by changing blades. Retaining nut 86 must be removed, the desired blade placed on shaft 28 and the retaining nut 86 replaced and tightened to obtain a different depth of cut. It is estimated that a depth of cut from ¾ inch to 1¾ inches will cover all the requirements of an on-the-job cabinet maker. The operation of the portable electric cutting and scoring saw is such that the scoring saw 14 leads into the workpiece. The scoring saw 14 and the cutting saw 12 turning in the opposite direction allows the scoring saw 14, whose thickness is greater than the cutting saw 12, to provide a path whereby the laminate 80 bonded to workpiece 78 will be cut smoothly without any chipping or tearout.

The present disclosure included that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without department from the spirit and scope of the invention.

What is claimed is:

1. A method of cutting a workpiece having a laminate or veneer on the top side or on the top and bottom side with a portable electric cutting and scoring saw comprising:

providing a housing to contain a high speed electric motor, a set of gears, bearings, a cutting saw shaft, a scoring saw shaft and an idler shaft;

providing a cutting saw blade and a scoring saw blade to said cutting saw shaft and said scoring saw shaft, respectively, said blades lying in the same plane, said scoring saw blade disposed in front of the cutting saw blade, said cutting saw blade depth is a minimum of ¾ inches and a minimum of 1¾ inches, said cutting saw blade depth being changed by changing the diameter of said cutting saw blade, said scoring saw blade depth is ⅛ inches, said scoring saw blade is approximately 0.002 inches wider on each side of two planes formed by the cutting saw blade width;

turning the cutting saw and scoring saw shafts by said high speed electric motor;

gearing the electric motor to said cutting and scoring saw shafts using said set of gears to directly drive said cutting saw blade and said scoring saw blade such that the cutting saw blades and scoring saw blades turn in opposite direction at least 5,000 R.P.M.;

providing a rear handle having an on and off spring biased trigger switch to turn on and off said electric motor, said rear handle also used to push said portable electric cutting and scoring saw across said workpiece;

providing a front handle to guide the cutting and scoring saw whereby turning on said electric motor, pushing on said rear handle and guiding said portable cutting and scoring saw by said front handle allows a smooth cut to be made on said workpiece.

2. A portable electric cutting and scoring saw for use on a workpiece having a top portion and a bottom portion with laminate or veneer bonded to the top portion or the bottom portion comprising:

housing means containing a front handle at one end and a rear handle with a trigger switch on the other end;

drive means contained in said housing means;

a drive shaft attached to said drive means;

a cutting saw shaft geared to said drive shaft;

a cutting saw blade connected to said cutting saw shaft;

an idle shaft geared to said drive shaft;

a scoring saw shaft geared to said idle shaft;

a scoring saw blade connected to said scoring saw shaft wherein said cutting saw blade and said scoring saw blade are directly driven by a set of gears;

guard means covering said scoring and said cutting saw blades.

3. A portable electric cutting and scoring saw as described in claim 2 wherein said housing means comprises a motor housing, a saw blade housing and a gearbox housing.

4. A portable electric cutting and scoring saw as described in claim 2 wherein said drive means attached to said drive shaft is a high speed electric motor.

5. A portable electric cutting and scoring saw as described in claim 4 wherein said electric motor has a power cord attached thereto.

6. A portable electric cutting and scoring saw as described in claim 2 wherein said drive shaft has a helical gear attached thereto.

7. A portable electric cutting and scoring saw as described in claim 2 wherein said cutting saw shaft has a helical gear attached thereto.

8. A portable electric cutting and scoring saw as described in claim 2 wherein said idle shaft has a helical gear attached thereto.

9. A portable electric cutting and scoring saw as described in claim 2 wherein said scoring saw shaft has a helical gear attached thereto.

10. A portable electric cutting and scoring saw as described in claim 2 wherein said drive shaft, cutting saw shaft, idler shaft and scoring saw shaft contain bearings pressed thereon.

11. A portable electric cutting and scoring saw as described in claim 10 wherein said bearings are of the self-lubricated type.

12. A portable electric cutting and scoring saw as described in claim 2 wherein said scoring saw blade and said cutting saw blade lie in the same plane and are in perfect alignment.

13. A portable electric cutting and scoring saw as described in claim 2 wherein said cutting saw blade and said scoring saw blade turn in opposite directions.

14. A portable electric cutting and scoring saw as described in claim 13 wherein said scoring saw blade cuts a depth of $\frac{1}{8}$ inch and said cutting saw blade cuts a minimum depth of $\frac{3}{4}$ inches and a maximum depth of $2\frac{3}{4}$ inches, said $\frac{3}{4}$ inch and $1\frac{3}{4}$ inches depths obtained by changing said cutting saw blades of different diameter.

15. A portable electric cutting and scoring saw as described in claim 2 wherein said scoring saw blade turns at least 5,000 R.P.M. and said cutting saw blade turns at least 5,000 R.P.M.

16. A portable electric cutting and scoring saw as described in claim 2 wherein said scoring saw blade has a cut width greater than the cut width of said cutting saw blade whereby said scoring saw blade cut width is approximately 0.002 inches on each side of two planes formed by the cutting saw cut width.

17. A portable electric cutting and scoring saw as described in claim 2 wherein said rear handle contains a spring biased trigger switch for turning on said drive means.

18. A portable electric cutting and scoring saw as described in claim 2 whereby said guard means is spring biased and rotates around the shaft of said cutting saw.

* * * * *